US008593998B2

(12) United States Patent
Phan Huy et al.

(10) Patent No.: US 8,593,998 B2
(45) Date of Patent: Nov. 26, 2013

(54) TIME REVERSAL METHOD OF PROCESSING SYMBOLS IN BIDIRECTIONAL COMMUNICATION

(75) Inventors: Dinh Thuy Phan Huy, Paris (FR); Jean-Marie Chaufray, Chatenay Malabry (FR)

(73) Assignee: France Telecom, Paris (FR)

(*) Notice: Subject to any disclaimer, the term of this patent is extended or adjusted under 35 U.S.C. 154(b) by 618 days.

(21) Appl. No.: 12/529,928

(22) PCT Filed: Feb. 7, 2008

(86) PCT No.: PCT/FR2008/050187
§ 371 (c)(1),
(2), (4) Date: Sep. 4, 2009

(87) PCT Pub. No.: WO2008/110722
PCT Pub. Date: Sep. 18, 2008

(65) Prior Publication Data
US 2010/0085902 A1    Apr. 8, 2010

(30) Foreign Application Priority Data
Mar. 5, 2007   (FR) ...................................... 07 53651

(51) Int. Cl.
*H04J 3/00*    (2006.01)
(52) U.S. Cl.
USPC ............................ 370/280; 370/345; 375/285
(58) Field of Classification Search
None
See application file for complete search history.

(56) References Cited

U.S. PATENT DOCUMENTS

| 6,862,326 | B1* | 3/2005 | Eran et al. ..................... 375/343 |
| 7,016,397 | B1* | 3/2006 | Vihriala ........................ 375/143 |
| 2003/0198201 | A1* | 10/2003 | Ylitalo et al. ................. 370/329 |
| 2004/0066802 | A1* | 4/2004 | Ro et al. ........................ 370/528 |
| 2004/0082356 | A1* | 4/2004 | Walton et al. ................. 455/522 |
| 2008/0267303 | A1* | 10/2008 | Baldemair et al. ............. 375/260 |
| 2010/0149962 | A1* | 6/2010 | Cho et al. ...................... 370/210 |

OTHER PUBLICATIONS

Gomes et al., "Time-Reversed OFDM Communication in Underwater Channels," 2004 IEEE $5^{th}$ Workshop on Signal Processing Advances in Wireless Communications, Lisbon, Portugal, Jul. 11-14, 2004, Piscataway, NJ, USA, IEEE, pp. 626-630 (Jul. 11, 2004).

* cited by examiner

*Primary Examiner* — Kevin C Harper
(74) *Attorney, Agent, or Firm* — Drinker Biddle & Reath LLP

(57) ABSTRACT

For processing symbols transmitted in frames and separated by guard intervals via a propagation channel between first and second communicating entities using time-division duplexing, the second entity receives at least one pulse transmitted by the first entity. The second entity estimates the impulse response of the propagation channel as a function of the pulse received and time reverses the estimated impulse response in order to filter the symbols as a function of the time-reversed impulse response. The second entity then transmits the modulated symbols and a second pulse to the first entity during a guard interval in a frame in order to process the modulated symbols.

8 Claims, 4 Drawing Sheets

TIME REVERSAL METHOD OF PROCESSING SYMBOLS IN BIDIRECTIONAL COMMUNICATION

CROSS-REFERENCE TO RELATED APPLICATIONS

This application is the U.S. national phase of the International Patent Application No. PCT/FR2008/050187 filed Feb. 7, 2008, which claims the benefit of French Application No. 07 53651 filed Mar. 5, 2007, the entire content of which is incorporated herein by reference.

FIELD

The present invention relates to processing symbols transmitted in a time-division duplexing (TDD) radiocommunications network using orthogonal frequency-division multiplex (OFDM) modulation, for example.

It relates more particularly to introducing the time reversal technique into such systems for communication in the uplink and downlink directions.

BACKGROUND

Most laws of physics, and in particular those that govern acoustics, are symmetrical relative to time. A time-reversed wave propagates like a forward wave going back in time.

Time reversal is a technique for focusing waves, typically acoustic waves, that relies on the invariance of the wave equation on time reversal. A short pulse transmitted from a source point propagates in an unknown propagation medium. A portion of this wave is picked up, generally by a set of sensors known as a time reversal mirror (TRM), digitized, and time reversed before being sent back in the propagation medium. The wave then retraces its previous steps and converges toward the source point, where it forms a short pulse. The signal collected at the source point is in a form virtually identical to that of the original signal transmitted from the source point. In particular, the more complex the propagation medium, the more accurately the reversed wave converges toward the source point.

The time reversal technique can be extended to radiocommunications networks to improve the equalization of the propagation channels and thus the processing of symbols received via those propagation channels. In this situation, using time reversal requires the transmitter to have knowledge about the propagation channels.

In the prior art, no radiocommunications network based on time-division duplexing, referred to more simply as time duplexing, uses the time reversal technique to improve the quality of service both in the uplink direction and in the downlink direction without recourse to additional network resources.

SUMMARY

To remedy the drawbacks referred to above, a method of the invention for processing symbols separated by guard intervals and transmitted in frames via a propagation channel between first and second communicating entities using time-division duplexing is characterized in that it includes, in the second entity:

after reception of a first pulse transmitted from the first entity, estimating the impulse response of the propagation channel as a function of the pulse received, time reversing the estimated impulse response, and filtering the symbols as a function of the time-reversed impulse response; and transmitting the filtered symbols and a second pulse to the first entity during a predetermined guard interval in a frame.

The second entity transmitting a pulse during the predetermined guard interval of the frame, whilst preserving the duration of the frame, enables the first entity to determine the propagation conditions of the channel before transmitting a frame. No additional time resource is therefore reserved specifically for estimating the impulse response of the propagation channel as a function of the pulse received in the frame.

According to other features of the invention, if each guard interval is assigned to transmitting redundancy data, the redundancy data relating to the predetermined guard interval is replaced by the pulse to be transmitted or the size of the redundancy data is reduced in the predetermined guard interval to transmit a pulse therein. In another implementation, the size of at least the redundancy data in the frame is reduced, guard intervals including the reduced-size redundancy data are made smaller, and the predetermined guard interval is created with a duration corresponding to the reduction in the size of the guard intervals.

Time reversal is therefore used with minimum impact on the frame structure, since the frame duration is unchanged and only the redundancy data relating to a guard interval is liable to be modified.

Moreover, the pulse can be transmitted during the last guard interval of the frame, in order for the entity receiving the pulse to determine a recent state of the propagation channel.

According to another feature, the second entity can comprise a plurality of antennas and transmit as many second pulses at different times during the frame as the second entity has antennas. The use in accordance with the invention of the time reversal technique is therefore adapted to systems with a plurality of transmit antennas and a plurality of receive antennas guaranteeing a high transmission bit rate in the uplink and downlink directions.

In one implementation of the invention, the pulse is transmitted in analog form during the predetermined guard interval of the frame. An impulse response of the propagation channel is then estimated as a function of the pulse received by the first entity and is used to filter a signal comprising the symbols of another frame as a function of the time-reversed impulse response.

In another implementation of the invention, the pulse is transmitted in the form of a bit sequence during the predetermined guard interval of the frame. An impulse response of the propagation channel is then estimated as a function of said bit sequence received by the first entity on the basis of a discrete model of the propagation channel and time reverses the estimated impulse response to filter symbols to be transmitted.

The invention also relates to a communicating entity for processing symbols separated by guard intervals and transmitted in frames via a propagation channel between said communicating entity and another communicating entity using time-division duplexing, characterized in that it includes:

means for estimating the impulse response of the propagation channel as a function of a first pulse received that was transmitted by said other entity;
means for time reversing the estimated impulse response;
means for filtering symbols as a function of the time-reversed impulse response; and means for transmitting the filtered symbols and a second pulse to said other entity during a predetermined guard interval in a frame.

Finally, the invention relates to a computer program adapted to be executed in a communicating unit to process symbols transmitted in frames using time-division duplexing, said program including instructions that execute the steps of the method of the invention when the program is executed in said communicating entity.

BRIEF DESCRIPTION OF THE DRAWINGS

Other features and advantages of the present invention become more clearly apparent on reading the following description of implementations of the invention given by way of non-limiting example and with reference to the corresponding appended drawings, in which.

DETAILED DESCRIPTION

Figure 1:
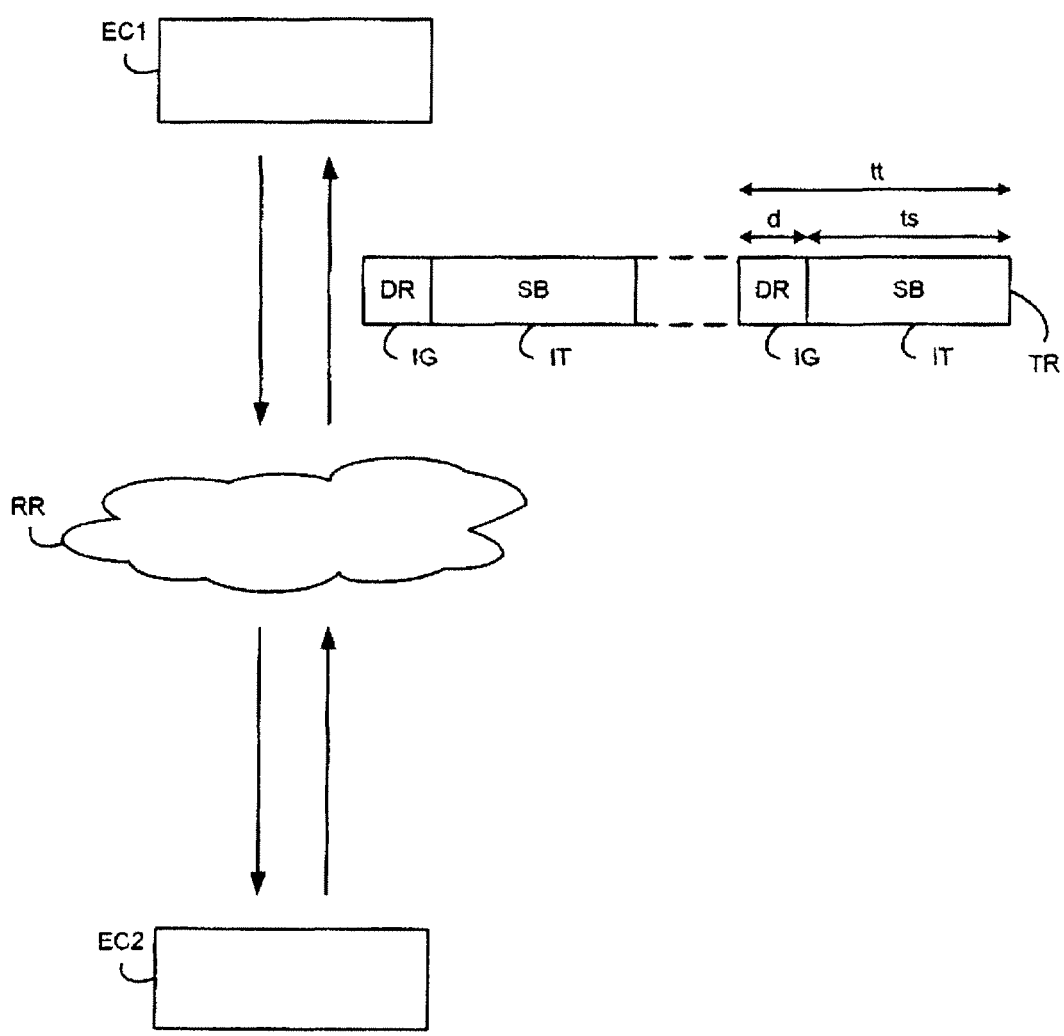
FIG. 1 is a block diagram of two entities communicating via a radiocommunications network.

Referring to FIG. 1, first and second communicating entities EC1 and EC2 are adapted to communicate via a radiocommunications network RR.

In a first implementation, the radio communications network RR is a cellular digital radio communications network, for example of the GSM (Global System for Mobile communications) or UMTS (Universal Mobile Telecommunications System) type, or a Wireless Local Area Network (WLAN) or a WIMAX (Worldwide Interoperability Microwave Access) network. One of the two communicating entities is then a base station and the other of the two communicating entities is a mobile radio terminal.

In a second implementation, the radiocommunications network RR is an ad hoc wireless local area network having no infrastructure. The two communicating entities are two terminals that communicate directly and spontaneously without the intermediary of communication centralization equipment such as an access terminal or point or a base station.

In the remainder of the description, the two communicating entities utilize a propagation channel for time-division duplex transmission of signals. In this bidirectional transmission mode, the propagation channel in a first direction, for example the downlink direction from the entity EC1 to the entity EC2, is substantially identical to the propagation channel in a second direction opposite the first direction, i.e. the uplink direction from the entity EC2 to the entity EC1. Communication between a base station and a mobile radio terminal is effected at different times for transmission and reception on the same carrier frequency. For example, at a first time, the base station (entity EC1) transmits on the downlink channel a signal that is received and processed by the mobile terminal (entity EC2) and during a second time slot the mobile terminal transmits on the uplink channel a signal that is received and processed by the base station.

Each entity EC1, EC2 transmits a signal during a radio frame TR containing time slots IT dedicated to transmitting symbols SB and separated by guard intervals IG.

The symbols carried by a signal transmitted over the propagation channel are subject to multipath echoes. A symbol SB transmitted by the first entity EC1 is received by the second entity EC2 in the form of a plurality of symbols attenuated and delayed differently. Consequently, a symbol transmitted during a given time slot IT can be at least partly superposed on an echo relating to the symbol transmitted during a time slot following the given time slot. Interference then occurs between the symbols. To prevent this interference, a guard interval IG of duration d is added between times slot IT of duration is occupied by $\bar{a}$ transmitted symbol.

The guard interval IG can be a dead time during which no data is transmitted. More generally, the guard interval IG is dedicated to transmitting a portion of a symbol, known as redundancy data DR, identical to the same length portion that terminates the symbol. Each symbol is therefore preceded by a periodic extension of itself. The total intended duration tt of the symbol transmitted is then tt=ts+d. For efficient elimination of interference between symbols, the guard interval and therefore the size of the redundancy data must cover all delays relating to the echoes of the symbols in order to compensate the dispersion of the propagation channel during processing of the received symbols.

For orthogonal frequency-division multiplex (OFDM) communication, the symbol portion transmitted during the guard interval IG is typically referred as the "cyclic prefix".

Moreover, each communicating entity EC1, EC2 includes an antenna corresponding to a propagation channel between the two single input-single output (SISO) communicating entities EC1 and EC2. In another implementation, each communicating entity EC1, EC2 comprises a plurality of antennas corresponding to propagation channels between the two multiple input-multiple output (MIMO) communicating entities EC1 and EC2.

Figure 2:
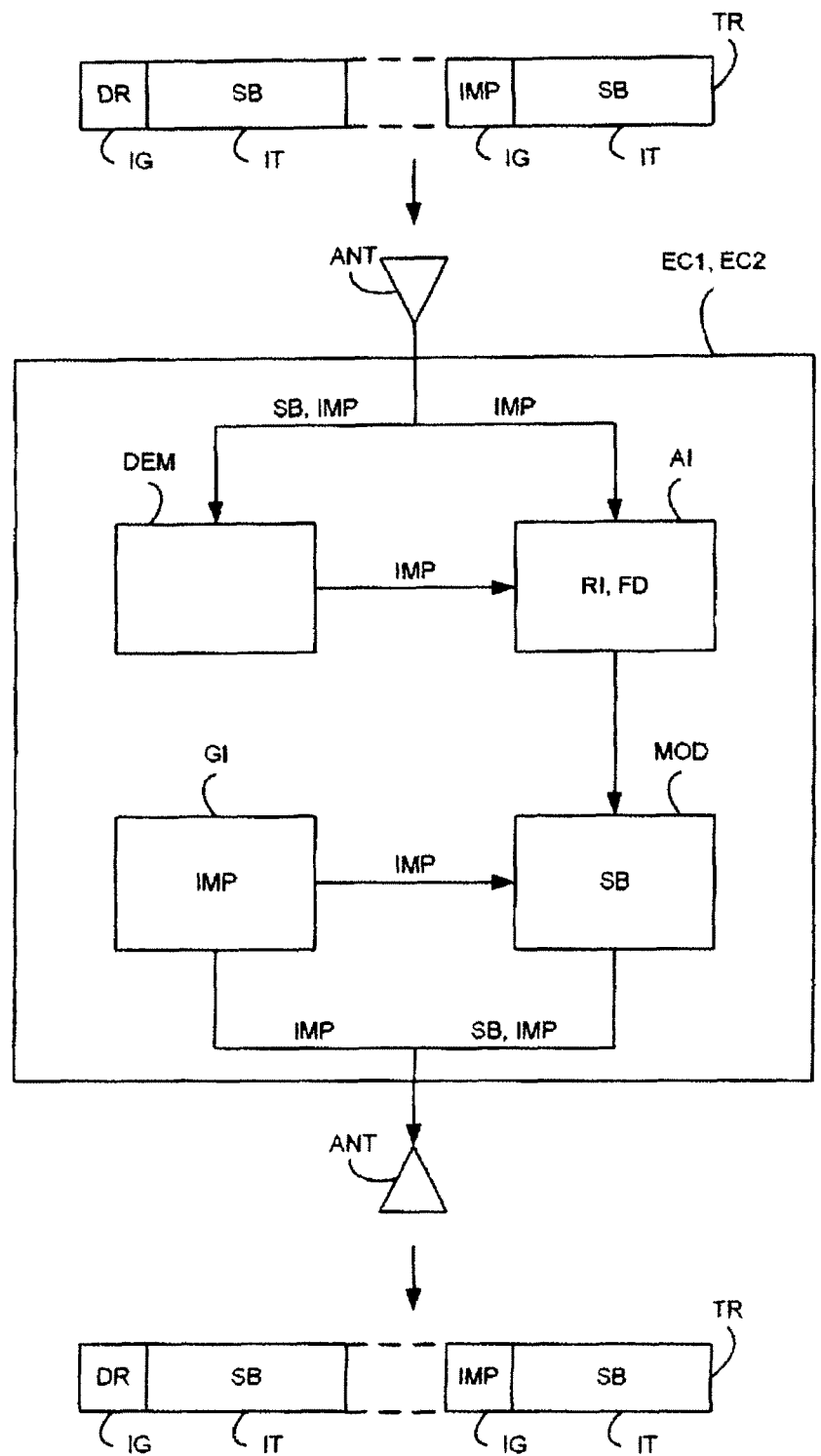
FIG. 2 is a block diagram of a communicating entity of the invention.

FIG. 2 shows only the means relating to the invention included in one of the two communicating entities. The two communicating entities comprise similar means since the principle of communication between the two entities is the same in the downlink direction and in the uplink direction. Those means comprise a modulator MOD, a pulse generator GI, a pulse analyzer AI, and a demodulator DEM. Each entity further comprises at least one transmit/receive antenna ANT that can consist of a plurality of antennas.

The modulator MOD converts a sequence of bits into complex symbols that are transmitted in the form of a block of symbols during a radio frame TR containing time slots IT each dedicated to transmitting a symbol SB. As described above, two consecutive time slots in each frame are separated by a guard interval IG during which either no signal is transmitted or redundancy data DR is transmitted.

For orthogonal frequency-division multiplex (OFDM) communication, the block of symbols transmitted during a frame contains 68 OFDM symbols separated from each other by redundancy data that consists of cyclic prefixes, for example.

By means of the time reversal technique, a pulse is transmitted from a source point, propagates in an unknown propagation medium, and is received and processed at a reception point. The received wave is then digitized and time reversed before being transmitted back into the propagation medium in order to converge toward the source point, where it forms a pulse.

According to the invention, the pulse IMP can be processed in analog or digital form.

In an implementation of the communicating entity using analog pulse processing, the pulse generator GI generates a pulse IMP that is transmitted during one or a few of the guard intervals IG of a radio frame TR of symbols to be transmitted. The pulse generator GI cooperates with the modulator MOD to transmit the pulse IMP only during a predetermined guard interval that is not dedicated to transmitting redundancy data, so that only the pulse transmitted for each radio frame TR by the transmit antenna is received without interference via the propagation channel by the receive antenna of the other communicating entity. The transmit and receive antennas of an entity can be combined in a single antenna ANT connected to a circulator.

The pulse of the transmitted radio frame TR is received by the receive antenna ANT of the other communicating entity and then processed directly by the pulse analyzer AI, which stores the impulse response RI of the propagation channel. The pulse analyzer AI time reverses the impulse response and forwards it to the modulator MOD, which in turn filters the symbols to be transmitted as a function of the time-reversed impulse response.

In an implementation of the communicating entity using digital pulse processing, the pulse generator GI commands the modulator MOD to insert a bit sequence, which can comprise only one bit at "1", during one or a few of the guard intervals IG of a radio frame TR of symbols to be transmitted. For example, said guard interval contains two series of bits at "0" separated by one bit at "1". Transmitting this bit sequence is then considered as transmitting a pulse IMP after analog conversion of the digital signal at the output of the pulse generator.

As known in the art, the symbols received by the receive antenna ANT of the other communicating entity during the radio frame TR are applied to amplification, frequency demodulation, and tuned filtering stages at the input of the demodulator DEM. The bits corresponding to the demodulated received pulse are then forwarded to the pulse analyzer AI which estimates the impulse response of the channel and time reverses it to form the transfer function of a pre-distortion digital filter FD to be forwarded to the modulator MOD, which uses the pre-distortion filter FD to filter the symbols of the next radio frame to be transmitted and then modulates the filtered symbols before transmitting them.

Thus in either of the analog or digital processing implementations the modulator MOD processes the symbols to be transmitted as a function of the received pulse and transmits another pulse in the frame of symbols to be transmitted. The signal transmitted by one of the entities and deformed as a function of the received pulse is then received by the other of the entities in a form similar to the form that the signal would have had if it had not been processed as a function of the received pulse, which is known as time reversal processing. By means of the time reversal technique, the transmitted signal converges toward the source point of the pulse, which reduces the dispersion of the propagation channel and improves the processing of the symbols received.

Figure 3:
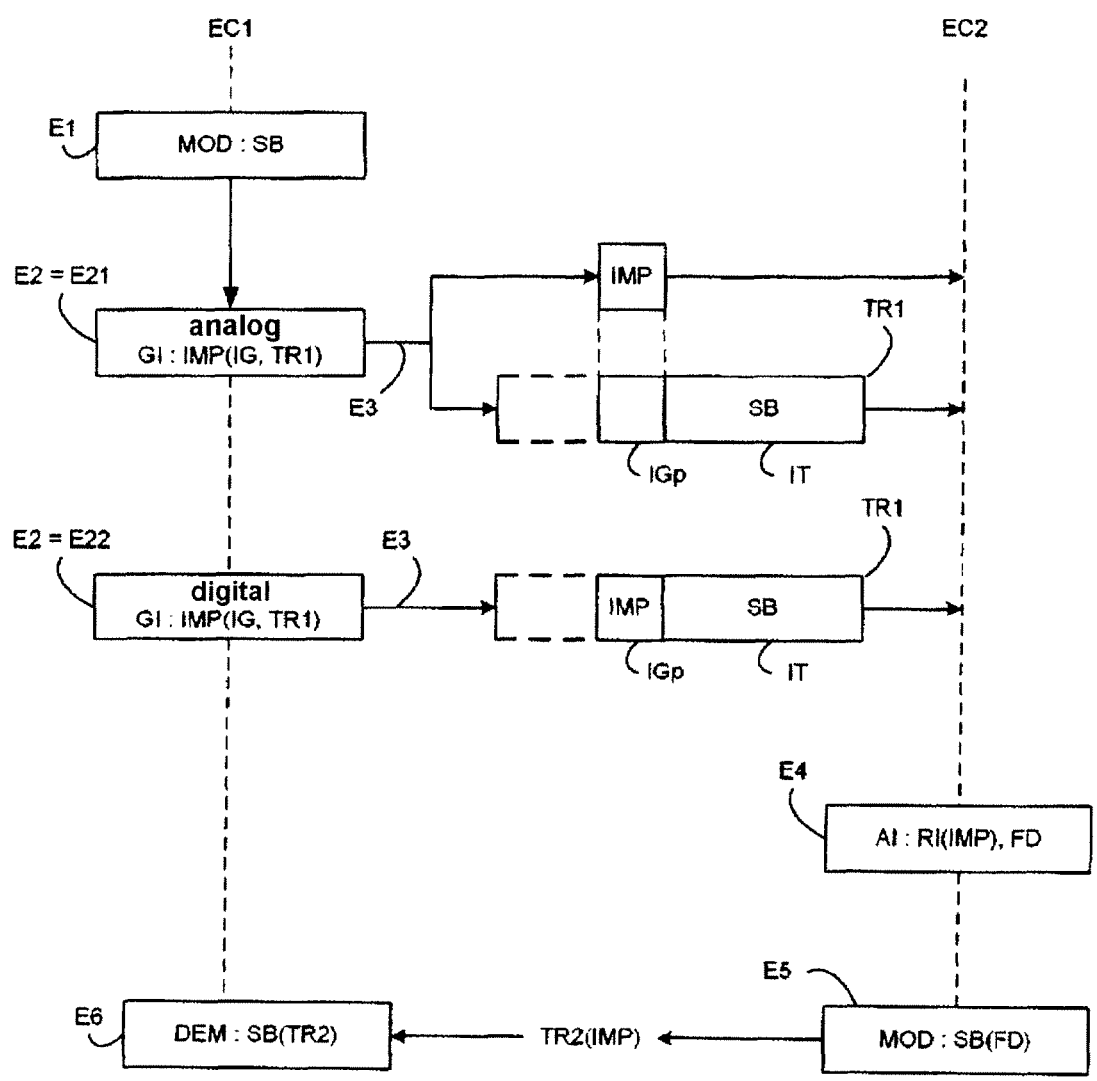
FIG. 3 shows an algorithm of a symbol processing method of the invention.

Referring to FIG. 3, the transmission method of the invention comprises steps E1 to E6 executed automatically in the two communicating entities.

For clarity, the steps E1 to E3 and E6 are described in relation to a first communicating entity EC1 and the steps E4 and E5 are described in relation to a second communicating entity EC2. Because the two entities communicate bidirectionally using time-division duplexing, the steps E1 to E3 and E6 and the steps E4 and E5 can also be executed in the second entity EC2 and the first entity EC1, respectively.

In the step E1, the modulator MOD of the first communicating entity EC1 converts a sequence of bits into symbols SB that are to be transmitted in the form of a block of symbols during a first radio frame TR1 containing time slots IT each of which is dedicated to transmitting a symbol SB and that are separated by guard intervals IG dedicated to transmitting redundancy data DR, for example.

In the step E2, the first communicating entity EC1 generates a pulse IMP to be transmitted during a predetermined guard interval IGp of the first radio frame TR1.

For example, the step E2 is either an analog processing step E21 or a digital processing step E22.

In the step E21, the pulse generator GI cooperates with the modulator MOD to generate a pulse IMP that must be transmitted during a predetermined guard interval IGp of the first radio frame TR1 of symbols to be transmitted. The pulse is for example mixed with the first frame TR1 during the guard interval IGp under the control of the pulse generator GI.

In the step E22, the pulse generator GI commands the modulator MOD to insert a predetermined bit sequence into a predetermined guard interval IGp of the first radio frame TR1 of symbols to be transmitted. The transmitted bit sequence takes the form of a pulse IMP after analog conversion of the predetermined bit sequence.

Figure 4A:
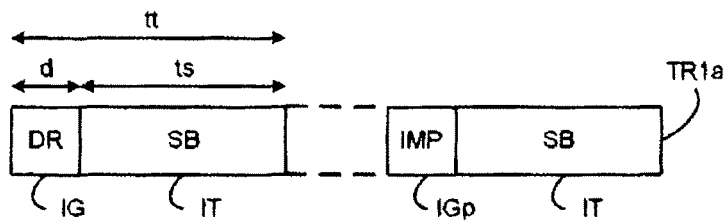
FIGS. 4A and 4B show a frame of symbols conforming to variants of a first implementation of the invention.
Figure 4B:
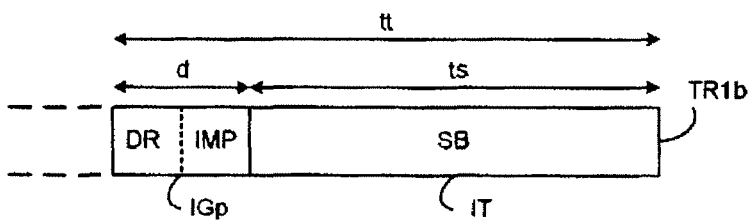

In a first implementation illustrated in FIGS. 4A and 4B, the predetermined guard interval IGp is assigned to transmitting redundancy data DR. In a first example of a radio frame TR1$a$ shown in FIG. 4A, the pulse IMP is transmitted in place of said redundancy data DR, which is erased and is not transmitted in the guard interval IGp. In a second example of a radio frame TR1$b$ shown in FIG. 4B, the size of the redundancy data DR is reduced to a predefined size thereby releasing a duration available for transmitting the pulse IMP in the predetermined guard interval IGp. The pulse is transmitted before or after the reduced redundancy data. In this first implementation, the total duration tt for each symbol transmitted is unchanged.

For example, the pulse IMP is transmitted during the final guard interval IG of the radio frame TR1 in order for the second entity EC2 to analyze as recent as possible an impulse response of the propagation channel for each frame period.

Alternatively, the guard intervals are not dedicated to transmitting redundancy data DR and the pulse IMP is transmitted during a predetermined guard interval IGp, for example the final one of the first frame TR1, without modifying the original data to be transmitted.

Figure 5:
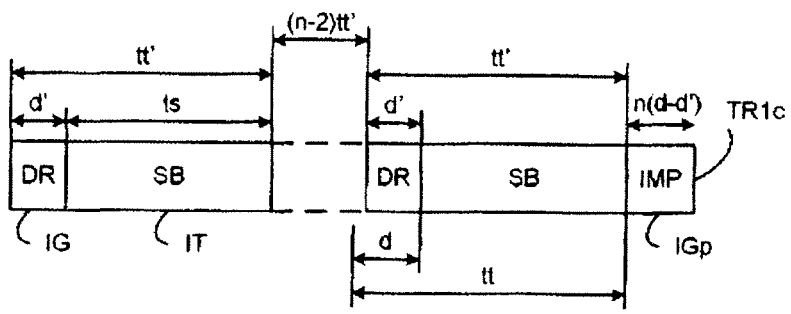
FIG. 5 shows a frame of symbols conforming to a second implementation of the invention.

In a second implementation illustrated in FIG. 5, some or all of the redundancy data DR of a radio frame TR1$c$ transmitted by the entity EC1 has a predefined reduced size relative to the size of the standard redundancy data and consequently the guard intervals IG including the reduced redundancy data are smaller. For example, at the end of the frame TR1$c$ there is released a duration corresponding to the reduction in the size of the guard intervals IG including the reduced redundancy data, which creates a guard interval for transmitting the pulse IMP.

The time reversal technique explained above reduces the dispersion of the propagation channel and therefore the echoes of the symbols received. Consequently, the redundancy data, which generally has a size able to cover at least all the delays relative to the echoes of the symbols, can be reduced in proportion to the reduction of the dispersion of the propagation channel.

If channel reversal is not used, the redundancy data DR is considered to be divided into 30 samples, for example. Using time reversal reduces the size of the redundancy data by at least one sample. If a radio frame TR1$c$ contains more than 30 symbols SB, and thus more than 30 items of redundancy data DR, at least 30 time units each relating to one redundancy data sample are released. The 30 time units are grouped together at the end of the frame to create a predetermined guard interval IGp that preserves the total duration of the frame. In this second implementation, the guard intervals IG have a duration d' that is reduced relative to the standard deviation d of the guard intervals. The total intended duration tt' for each symbol transmitted is also reduced relative to the standard total duration tt of the symbols. Generally speaking, for a frame TR1c containing n symbols, where n is an integer, the duration of the pulse IMP in the predetermined guard interval IGp is n×(d−d').

In the step E3, the first entity EC1 transmits the first frame TR1 and the pulse IMP during the predetermined guard interval IGp of the frame TR1 to the second entity EC2 via the propagation channel between the transmit antenna of the first entity EC1 and the receive antenna of the second entity EC2.

In the step E4, after receiving the pulse IMP transmitted by the first entity EC1 in the step E3, the second entity EC2 estimates an impulse response of the propagation channel as a function of the received pulse and time reverses the estimated impulse response. The time-reversed impulse response is used for dynamic construction of a digital filter to be applied by the second entity EC2 to symbols to be transmitted.

For example, the pulse analyzer AI of the second entity EC2 directly stores the impulse response RI of the propagation channel as a function of the pulse received. The pulse analyzer AI time reverses the impulse response. To this end, the pulse analyzer AI stores the coefficients of the impulse response RI and classifies the conjugates thereof in an order that is the reverse of that of the coefficients of the impulse response, for example. These coefficients are then those of the time-reversed impulse response and are used for the dynamic construction of a pre-distortion digital filter FD for filtering the symbols to be transmitted. The pulse analyzer AI forwards the filter FD to the modulator MOD.

In a different implementation, in the step E4, the pulse analyzer AI analyzes the impulse response RI of the propagation channel as a function of the pulse received by an analog splitter under the control of the pulse analyzer and deduces from it a discrete model of the propagation channel. The pulse analyzer AI then time reverses the discrete model of the channel to form a pre-distortion filter FD that is forwarded to the modulator MOD in order for the pre-distortion filter to filter the symbols to be transmitted.

In the step E5, the second entity EC2 uses the pre-distortion filter to filter symbols to be transmitted to the first entity EC1 as a function of the time-reversed impulse response. The second entity EC2 then transmits to the first entity EC1 a second frame TR2 containing the symbols filtered as a function of the time-reversed impulse response after the step E4.

Moreover, in the same manner as in the step E2, the second entity EC2 transmits a pulse IMP in analog or digital form during a predetermined guard interval IGp of the second frame TR2. Accordingly, the first entity EC1 processes the pulse contained in the second frame TR2 in the same manner as in the step E4.

In the step E6, the first entity EC1 receives the second frame TR2. The time reversal technique reduces the time dispersion of the propagation channel. The demodulator DEM of the first entity equalizes and then recovers the symbols of the second frame more simply and more quickly than in the prior art technique, since the signal corresponding to the frame received is "pre-equalized" in the entity EC2 when transmitted, i.e. the received signal contains few echoes and is similar in amplitude and frequency to the signal that was initially applied to the modulator MOD before time-reversal processing of the symbols.

It is clear that the processing effected in the step E6 is also effected by each entity on receiving a frame. The symbols of a frame are processed as and when the frame is received.

When the two entities are communicating, it is only for the very first frame transmitted that the processing of the received symbols does not benefit from simplifying the equalization through time reversal, since the entity that transmitted that frame has not yet received any pulses to enable it to take account of the propagation conditions of the channel.

Alternatively, each entity EC1, EC2 functions in spatial diversity mode and comprises a plurality of transmit/receive antennas. In the method described above, a pulse is specific to the propagation channel between a transmit antenna of the first entity EC1 and a receive antenna of the second entity EC2. If the first entity EC1 comprises AN1 antennas and the second entity EC2 comprises AN2 antennas, then there are AN1×AN2 propagation channels between the two entities, the numbers AN1 and AN2 being integers that are different or equal.

In this situation, during the steps E1 to E3, the first entity EC1 transmits AN1 separate pulses at different times during a first frame TR1 via the respective AN1 transmit antennas. In the second entity EC2, during the second frame TR2, at least AN2 separate pulses must be transmitted at respective different times by the AN2 transmit antennas.

For example, in the first implementation described above with reference to FIGS. 4A and 4B, AN1 pulses are respectively transmitted during the last AN1 guard intervals IG of the first frame TR1a or TR1b.

In the second implementation described above with reference to FIG. 5, AN1 pulses are transmitted successively at the end of the first frame TR1c during a guard interval duration created by the reduction of the guard intervals IG, for example.

For example, for each pulse received by the second entity EC2, the pulse analyzer AI estimates the impulse response of the propagation channels between an antenna of the first entity by which the pulse was transmitted and the various antennas of the second entity. For each pulse received, the pulse analyzer therefore estimates AN2 impulse responses and after receiving all of the first frame TR1 the pulse analyzer has estimated AN1×AN2 impulse responses.

The second entity EC2 time reverses the AN1×AN2 estimated pulse responses and combines them to form a single pre-distortion digital filter FD. For example, the coefficients of the same rank of each reversed impulse response are weighted and summed to obtain a coefficient of the pre-distortion filter FD. The second entity EC2 then filters symbols as a function of the pre-distortion filter FD and transmits the filtered symbols to the first entity EC1, which receives them on each of the AN1 antennas.

In another variant, one of the two entities in fact consists of a plurality of entities. For example the second entity EC2 consists of N second entities EC21 to EC2N, with N≥2. Each second entity EC2n, with 1≤n≤N, comprises AN2n antennas and the first entity EC1 comprises AN1 antennas. There are then AN1×AN2n propagation channels between the first entity EC1 and each second entity EC2n.

As before, the first entity EC1 transmits AN1 separate pulses at different times during a first frame TR1 via the respective AN1 transmit antennas. In each second entity EC2n, during the second frame TR2, at least AN2n separate pulses must be transmitted at different times by the respective AN2n transmit antennas. For example, respective commands to transmit the pulses are transmitted to the N second entities in signaling messages from the first entity EC1.

For each pulse received, the pulse analyzer of each second entity EC2$n$ estimates AN2$n$ impulse responses and after receiving the whole of the first frame TR1 the pulse analyzer has estimated AN1×AN2$n$ impulse responses. Each second entity EC2$n$ time reverses the AN1×AN2$n$ estimated pulse responses and combines them to construct dynamically a single pre-distortion digital filter FD$n$. Each second entity EC2 then filters symbols using the filter FD$n$ and transmits the filtered symbols to the first entity EC1.

The invention described here relates to a method and a communicating entity for processing symbols transmitted in frames using time-division duplexing. In one implementation, the steps of the method of the invention are determined by the instructions of a computer program incorporated in the communicating entity. The program includes program instructions which execute the steps of the method of the invention when said program is executed in a processor of the communicating entity the operation of which is then controlled by the execution of the program.

Consequently, the invention also applies to a computer program, notably a computer program stored on or in a storage medium readable by computer or any other data processing device, adapted to implement the invention. This program can use any programming language and take the form of source code, object code or a code intermediate between source code and object code such as a partially compiled form or any other form desirable for implementing the method of the invention.

The storage medium can be any entity or device capable of storing the program. For example, the medium can include storage means in which the computer program of the invention is stored, such as a ROM, for example a CD ROM or a microelectronic circuit ROM, or a USB key, or magnetic storage means, for example a floppy disk or a hard disk.

Furthermore, the storage medium can be a transmissible medium such as an electrical or optical signal, which can be routed via an electrical or optical cable, by radio or by other means. The program of the invention can in particular be downloaded over an Internet-type network.

Alternatively, the storage medium can be an integrated circuit incorporating the program and adapted to execute the method of the invention or to be used in its execution.

The invention claimed is:

1. A method of processing symbols separated by guard intervals and transmitted in frames via a propagation channel between first and second communicating entities using time-division duplexing, said method comprising, in the second entity, the steps of:
    after reception of a first pulse transmitted from the first entity, estimating an impulse response of the propagation channel as a function of the pulse received, time reversing the estimated impulse response, and filtering symbols to be sent to the first entity as a function of the time reversed impulse response; and
    transmitting to the first entity the filtered symbols within a frame transmitted by the second entity and a second pulse within a predetermined guard interval of the frame transmitted by the second entity.

2. A method of processing symbols separated by guard intervals and transmitted in frames via a propagation channel between first and second communicating entities using time-division duplexing, said method comprising, in the second entity, the steps of:
    after reception of a first pulse transmitted from the first entity, estimating an impulse response of the propagation channel as a function of the pulse received, time reversing the estimated impulse response, and filtering symbols to be sent to the first entity as a function of the time reversed impulse response; and
    transmitting to the first entity the filtered symbols within a frame transmitted by the second entity and a second pulse within a predetermined guard interval of the frame transmitted by the second entity,
    wherein each guard interval is assigned to transmitting redundancy data, and the transmitting of the second pulse in the predetermined guard interval comprises substituting the second pulse to be transmitted for the redundancy data in the predetermined guard interval.

3. A method of processing symbols separated by guard intervals and transmitted in frames via a propagation channel between first and second communicating entities using time-division duplexing, said method comprising, in the second entity, the steps of:
    after reception of a first pulse transmitted from the first entity, estimating an impulse response of the propagation channel as a function of the pulse received, time reversing the estimated impulse response, and filtering symbols to be sent to the first entity as a function of the time reversed impulse response; and
    transmitting to the first entity the filtered symbols within a frame transmitted by the second entity and a second pulse within a predetermined guard interval of the frame transmitted by the second entity,
    wherein each guard interval is assigned to transmitting redundancy data, and the transmitting of the second pulse in the predetermined guard interval comprises reducing a size of the redundancy data in the predetermined guard interval in order to transmit the second pulse therein.

4. A method according to claim 1, wherein each guard interval is assigned to transmitting redundancy data, and the transmitting of the second pulse in the predetermined guard interval comprises reducing a size of at least some redundancy data in the frame, reducing a size of the guard intervals including the reduced redundancy data, and creating the predetermined guard interval having a duration corresponding to the reduction in the size of the guard intervals.

5. A method according claim 1, wherein the predetermined guard interval is a final guard interval of the frame.

6. A method according to claim 1, wherein the second entity comprises a plurality of antennas and that said method further comprising the step of the second entity transmitting as many second pulses at different times during the frame as the second entity has antennas.

7. A communicating entity for processing symbols separated by guard intervals and transmitted in frames via a propagation channel between said communicating entity and another communicating entity using time-division duplexing, comprising:
    an estimator for estimating the impulse response of the propagation channel as a function of a first pulse received that was transmitted by said other entity;
    an analyzer for time reversing the estimated impulse response;
    a filter for filtering symbols as a function of the time reversed impulse response; and
    a transmitter for transmitting to said other entity the filtered symbols within a frame transmitted by said communicating entity and a second pulse within a predetermined guard interval of the frame transmitted by said communicating entity,
    wherein the transmitter substitutes the second pulse to be transmitted for redundancy data in the predetermined guard interval or reduces a size of the redundancy data in the predetermined guard interval in order to transmit the second pulse therein.

8. A non-transitory computer-readable storage medium storing a computer program including instructions for executing the steps of the method according to claim 1.

\* \* \* \* \*